United States Patent [19]

Simon, deceased et al.

[11] Patent Number: 5,224,648

[45] Date of Patent: Jul. 6, 1993

[54] TWO-WAY WIRELESS HVAC SYSTEM AND THERMOSTAT

[75] Inventors: Bernard S. Simon, deceased, late of St. Louis Park, by Barbara J. Simon, Executor; Wade W. Smith, Plymouth, both of Minn.

[73] Assignee: American Standard Inc., New York, N.Y.

[21] Appl. No.: 858,480

[22] Filed: Mar. 27, 1992

[51] Int. Cl.⁵ ............................................. F24F 3/00
[52] U.S. Cl. .................................. 236/51; 236/49.3; 165/22; 375/1
[58] Field of Search ................... 236/51, 49.3, 1 B; 165/12, 22; 375/1; 340/870.11, 870.15, 870.41

[56] References Cited

U.S. PATENT DOCUMENTS

| | | | |
|---|---|---|---|
| Re. 33,875 | 4/1992 | Tsuchiya | 375/1 |
| 3,605,877 | 9/1971 | Isaacs et al. | 165/26 |
| 4,028,078 | 6/1977 | Peckham | 62/101 |
| 4,028,688 | 6/1977 | Goleman | 340/227 |
| 4,132,355 | 1/1979 | Cleary et al. | 236/47 |
| 4,174,517 | 11/1979 | Mandel | 340/310 |
| 4,220,011 | 9/1980 | Bergman et al. | 62/185 |
| 4,223,537 | 9/1980 | Sanborn et al. | 62/174 |
| 4,278,841 | 7/1981 | Regennitter et al. | 179/5 |
| 4,315,249 | 2/1982 | Apple et al. | 320/825 |
| 4,336,902 | 6/1982 | Neal | 236/46 |
| 4,341,345 | 7/1982 | Hammer et al. | 236/46 |
| 4,362,270 | 12/1982 | Cleary et al. | 236/46 |
| 4,389,577 | 6/1983 | Anderson et al. | 307/39 |
| 4,391,913 | 7/1983 | Keldmann | 236/36 |
| 4,433,719 | 2/1984 | Cherry et al. | 165/26 |
| 4,446,913 | 5/1984 | Krocker | 165/12 |
| 4,479,604 | 10/1984 | Didner | 236/46 |
| 4,482,785 | 11/1984 | Finnegan et al. | 179/5 |
| 4,502,290 | 3/1985 | Suzuki et al. | 62/229 |
| 4,585,164 | 4/1986 | Butkovich et al. | 236/51 |
| 4,673,127 | 6/1987 | Grant | 236/51 |
| 4,679,411 | 7/1987 | Pearse, Jr. | 62/519 |
| 4,703,325 | 10/1987 | Chamberlin et al. | 340/825 |
| 4,704,607 | 11/1987 | Teather et al. | 340/825 |
| 4,729,293 | 3/1988 | Tsunoda et al. | 98/40 |
| 4,734,871 | 3/1988 | Tsunoda et al. | 364/557 |
| 4,784,319 | 11/1988 | Kaiser | 236/46 |
| 4,795,089 | 1/1989 | Tezuka et al. | 236/49 |
| 4,811,195 | 3/1989 | Evans | 364/133 |
| 4,818,970 | 4/1989 | Natale et al. | 340/539 |
| 4,824,012 | 4/1989 | Tate | 236/49 |
| 4,830,274 | 5/1989 | Johnson et al. | 236/1 |
| 4,832,068 | 5/1989 | Wendschlag et al. | 62/197 |
| 4,838,483 | 6/1989 | Nurczyk et al. | 236/49 |
| 4,856,286 | 8/1989 | Sulfstede et al. | 62/89 |
| 4,860,950 | 8/1989 | Reeser et al. | 236/51 |
| 4,864,588 | 9/1989 | Simpson et al. | 375/1 |
| 4,917,174 | 4/1990 | Ring | 165/26 |
| 4,927,339 | 5/1990 | Riffe et al. | 418/55 |
| 4,928,750 | 5/1990 | Nurczyk | 165/2 |
| 4,948,045 | 8/1990 | Romano | 236/51 |
| 4,957,517 | 9/1990 | Linnert | 55/184 |
| 4,965,759 | 10/1990 | Uchida et al. | 364/604 |
| 4,969,508 | 11/1990 | Tate et al. | 165/22 |
| 5,004,999 | 4/1991 | Hartmann et al. | 340/539 |
| 5,008,899 | 4/1991 | Yamamoto | 371/1 |
| 5,039,009 | 8/1991 | Baldwin et al. | 236/51 |
| 5,114,070 | 5/1992 | Lilja et al. | 236/49.3 |
| 5,117,900 | 6/1992 | Cox | 236/49.3 X |

OTHER PUBLICATIONS

Mitsubishi Electric, *Split-Type Ductless Air Conditioners and Heat Pumps*, 1991.

The Air Conditioning, Heating and Refrigeration News, Mitsubishi Electric Advertisement, May 27, 1991.

Trane, *Understanding HVAC Systems—A New Process*, SYS-CLC-1, 1991.

*Primary Examiner*—Harry B. Tanner
*Attorney, Agent, or Firm*—William J. Beres; William O'Driscoll; Peter D. Ferguson

[57] ABSTRACT

A building automation system comprising: means for conditioning air; means, associated with the air conditioning means, for distributing the conditioned air to at least one space to be conditioned and means for sensing environmental conditions in the at least one space to be conditioned. The building automation system also includes means for managing the operation of the conditioning means, the distributing means, and the sensing means; and means, using wireless two-way transmissions, for operably linking the managing means, the conditioning means, the distributing means, and the sensing means.

6 Claims, 5 Drawing Sheets

TWO-WAY WIRELESS HVAC SYSTEM AND THERMOSTAT

BACKGROUND OF THE INVENTION

The present invention is directed to a two-way wireless communication system for linking the elements of an HVAC or building automation system. For purposes of this application, an HVAC system is an assembly of physically distinct, diverse elements operating together to accomplish heating, cooling and/or air conditioning. A building automation system is a linked assembly of controllers working together or under the direction of a central controller, and monitoring and controlling the operation of an HVAC system, a security system, or the like in one or more buildings to optimize the operation of the monitored system(s).

Presently HVAC systems have elements which are linked by wiring either directly, such as by twisted pair or cable, or which are linked indirectly, such as by power line carrier. Typical building automation systems and HVAC systems have elements which are linked by electrical connecting wires such as cable, twisted paired wires, or fiber optic cable. The cost of wiring and fiber optic cable is expensive both in installation and for material. Additionally, all such wiring must comply with local ordinances as well as national electrical codes. Furthermore, the use of permanent wiring limits both the initial design of the HVAC or building automation system, as well as subsequent improvements, modifications, and retrofits.

To date, no one has successfully implemented a wireless two-way HVAC or building automation system to link the system's controllers and sensors. To a limited extent some infrared transmissions are used to control some dampers. However, the infrared, light and ultrasonic transmission mediums are all subject to line of sight restrictions. Radio frequency transmissions, while not restricted to line of sight applications, have not been feasible for building automation systems and HVAC systems because radio frequency transmissions are subject to severe interference from building structures as well as from electronic devices. Additionally, FCC regulations limit the broadcasting of frequency ranges of radio frequency transmissions, which in turn further limits the applicability of radio frequency transmissions in building automation and HVAC systems.

Essentially, all known existing HVAC and building automation systems rely on a physical link between the major system elements. A wireless HVAC system and a wireless building automation system have heretofore been unknown.

SUMMARY OF THE INVENTION

It is an object, feature and an advantage of the present invention to solve the problems of prior HVAC and building automation systems.

It is an object, feature and an advantage of the present invention to reduce the cost of installing HVAC and building automation systems by eliminating wiring costs and wiring installations costs.

It is an object, feature and an advantage of the present invention to facilitate the retrofit or redesign of an HVAC or building automation system.

It is an object, feature and an advantage of the present invention to provide an HVAC or building automation system whose elements communicate without the use of interconnecting wiring.

It is an object, feature and an advantage of the present invention to provide an HVAC or building automation system whose elements communicate by wireless transmission.

It is a object, feature and an advantage of the present invention to provide an HVAC or building automation system whose elements communicate by spread spectrum radio frequency wireless transmissions.

It is an object, feature and an advantage of the present invention to provide an HVAC or building automation system whose elements communicate by wireless transmissions in spite of intervening buildings or other interference.

It is an object, feature and an advantage of the present invention to allow HVAC or building automation system elements to communicate by wireless transmissions in spite of intervening physical barriers.

The present invention provides a building automation system comprising: means for conditioning air; means, associated with the air conditioning means, for distributing the conditioned air to at least one space to be conditioned and means for sensing environmental conditions in the at least one space to be conditioned. The building automation system also includes means for managing the operation of the conditioning means, the distributing means, and the sensing means; and means, using wireless two-way transmissions, for operably linking the managing means, the conditioning means, the distributing means, and the sensing means.

The present invention also provides a two-way wireless HVAC system. The two-way wireless HVAC system comprises: a system controller including first means for wireless transmission and first means for wireless reception. The system controller also including means, operably associated with the first transmission means and the first reception means, for monitoring and coordinating the activities of an HVAC system and for transmitting wireless commands. The two-way wireless HVAC system also includes means for conditioning air; means, associated with the air conditioning means, for supply conditioned air from the air conditioning means to at least one space to be conditioned and means for controlling the air conditioning means. The controlling means includes and is operably connected to second means for wireless transmission and second means for wireless reception. The two-way wireless HVAC system also includes means within the at least one space for sensing an environmental condition. The sensing means includes and is operably connected to third means for wireless transmission and third means for wireless reception. The HVAC system includes at least one of the sensing means transmitting environmental conditions to the system controller and at least one of the air conditioning means receiving wireless commands from the system controller.

The present invention further provides a method of operating a building automation system comprising the steps of: conditioning air; distributing the conditioned air to at least one space; sensing environmental conditions in the at least one space and controlling the conditioning of air, the distributing of air, and the sensing of environmental conditions. The method also includes the steps of coordinating the conditioning of air, the distributing of air, and the sensing of environmental conditions; and linking the physical components of the building automation system with two-way, wireless spread spectrum radio frequency transmissions.

DETAILED DESCRIPTION OF THE DRAWING

Figure 1:
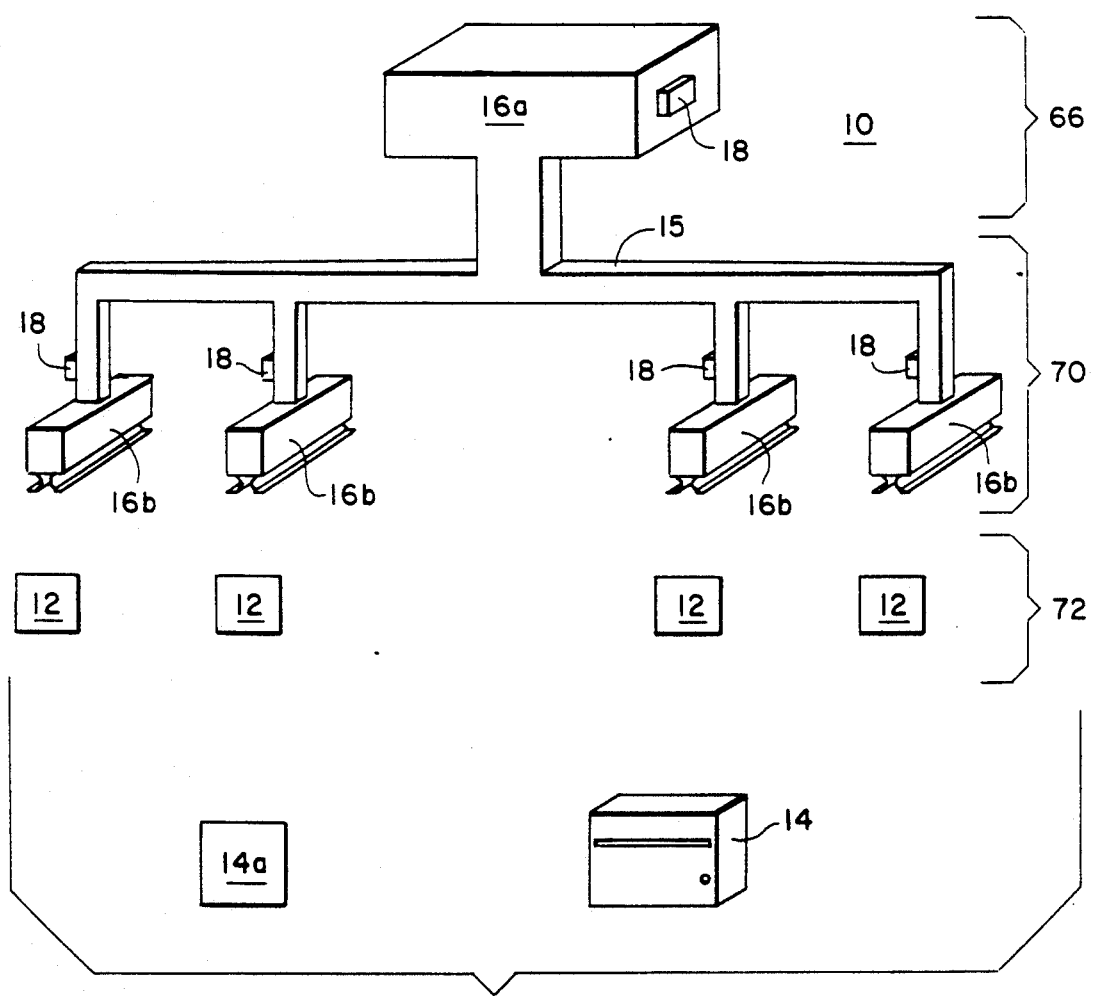
FIG. 1 shows a block diagram of two-way wireless HVAC system in accordance with the present invention.
Figure 2:
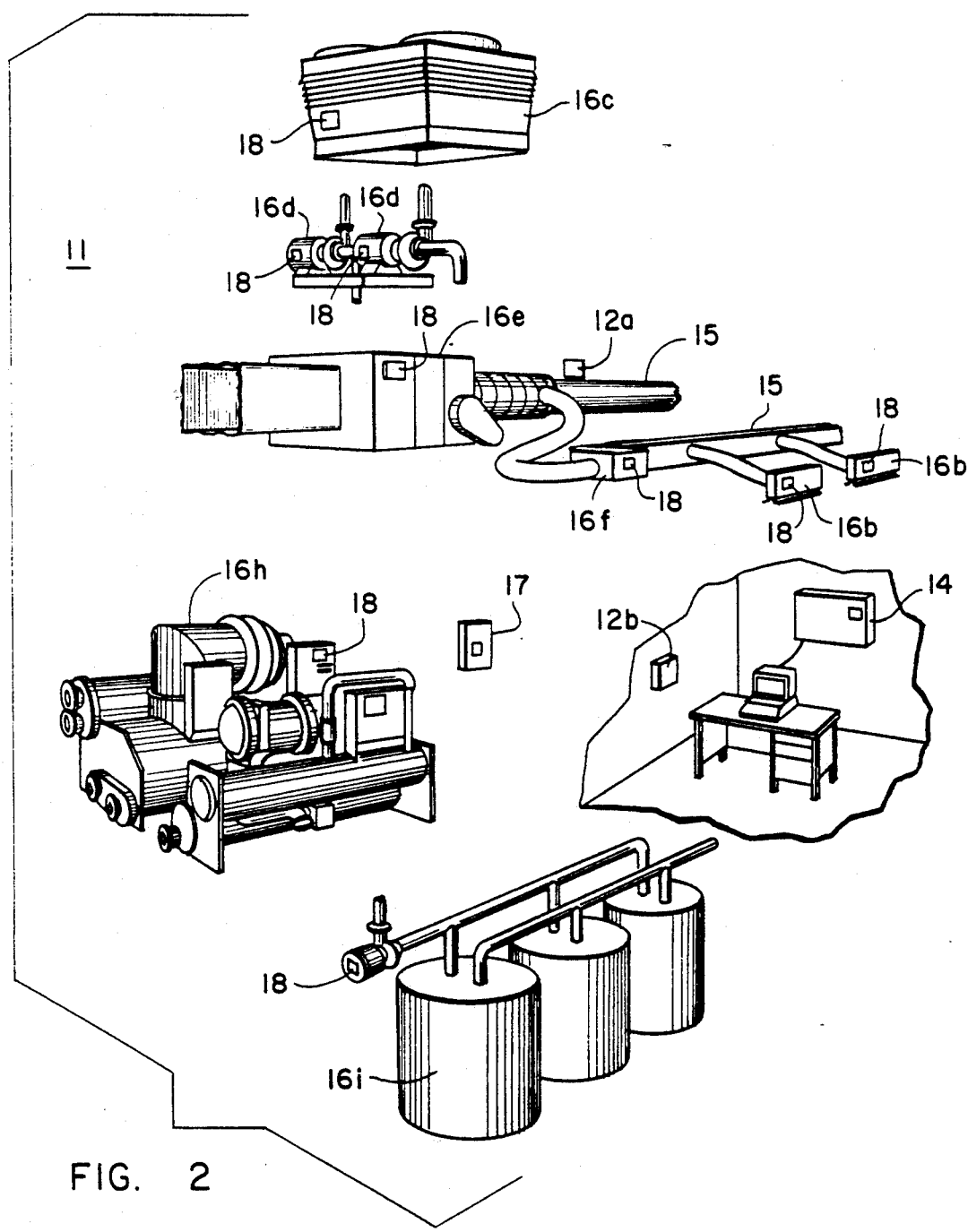
FIG. 2 shows a sensing device for use with the present invention.

FIGS. 1 and 2 are block diagrams of a two-way wireless HVAC systems 10, 11. The systems 10, 11 each include at least one sensor 12, at least one system controller 14 and at least one air conditioning device 16 which is controlled by an associated device controller 18. In accordance with the present invention, each of the sensing devices 12, the system controller 14, and the device controller 18 are linked by a two-way wireless communications system, preferably using spread spectrum radio frequency transmissions. Spread spectrum radio frequency transmissions have never before been used to link the elements of a building automation system or an HVAC system.

The system 10 of FIG. 1 illustrates a rooftop air conditioner 16a providing conditioned air through air ducts 15 for distribution by damper controlled diffusers 16b.

The system 11 of FIG. 2 illustrates a centrifugal chiller 16h which provides chilled water to at least one central station air handler 16e for conditioning air. The conditioned air is directed by ducts 15 to various VAV controllers 16f for further distribution to the diffusers 16b. The heated water is returned to the centrifugal chiller 16h to be cooled by a chilled water loop including chilled water pumps 16d and a cooling tower 16c. Conventional arrangements for such the system 11 are illustrated by applicant's publication "Understanding HVAC Systems A New Process", SYS-CLC-1 which is hereby incorporated by reference. The system 11 may also include a thermal storage system 16c. Each element 16a, 16b, 16c, 16d, 16e, 16f, 16h and 16i is controlled by an associated device controller 18. Groups of similar air conditioners 16 may be controlled by a local coordinating controller 17 which functions as a subset of a system controller 14.

Figure 3:
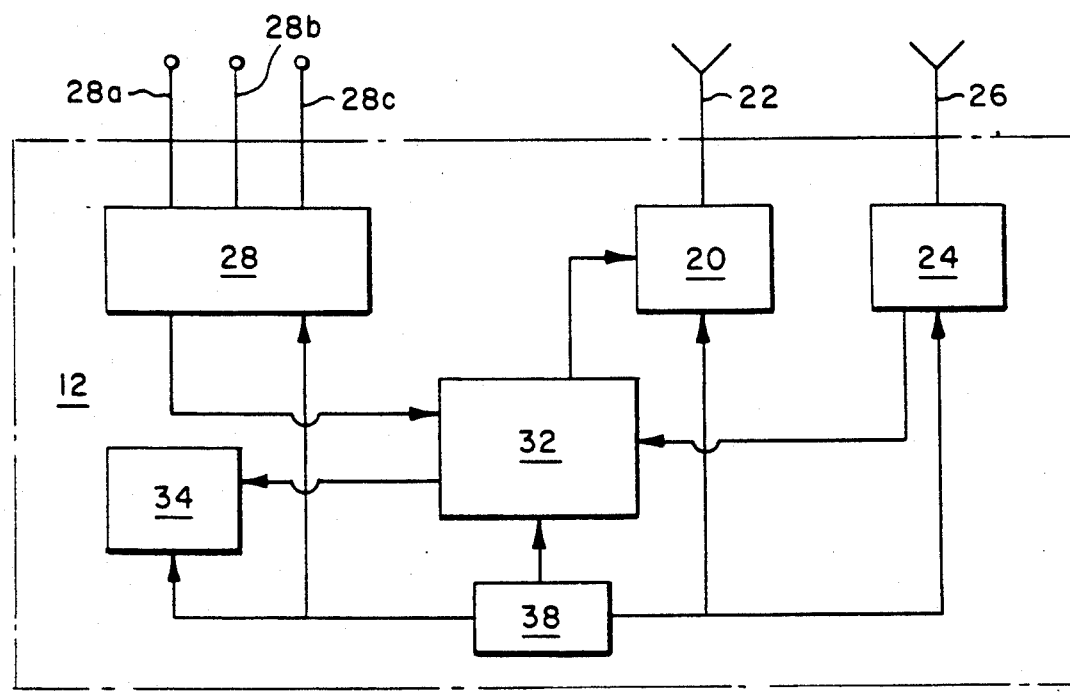
FIG. 3 shows a system controller for use with the present invention.

As shown in FIG. 3, each of the sensing devices 12 includes a wireless transmitter 20 with a transmitting attachment 22, and a wireless receiver 24 with a receiving attachment 26. The transmitter 20 and the receiver 24 are described in connection with FIGS. 6 and 7. The sensing device 12 also includes at least one sensor 28 operatively connected to a sensing device controller 32 preferably including a microprocessor. The sensing device controller 32 receives sensory data from the sensor 28, controls the timing of the transmissions by the transmitter 20, and controls a user interface display 34 displaying sensed information as well as set points.

Each element of the sensing device 12 is connected to a power supply 38 which supplies the necessary power to those elements. The power supply 38 is preferably an internal storage device such as a battery, but also may be a connection to a source of AC or DC external power, or may be a power-generating device such as a solar cell.

The sensing device 12 itself can be a zone sensor, a thermostat, a duct temperature sensor, or any other conventional sensing device such as a humidity sensor, a carbon dioxide sensor or an indoor air quality sensor. When the sensing device 12 functions as a zone sensor or a thermostat, the sensor 28 typically includes a temperature sensing element 28a, a mode of operation sensing element 28b, and/or a setpoint sensing element 28c. The functions of the temperature sensing element 28a, the mode of operation sensing element 28b, and the setpoint sensing element 28c may be implemented by physically separate elements or by a thermostat such as shown in U.S. Pat. Nos. 4,446,913 to Krocker and 5,039,009 to Baldwin et al. These patents are assigned to the assignee of the present invention and are herein incorporated by reference.

In operation, the sensing device controller 32 receives a sensory signal from the sensor 28, formats the sensory signal, and forwards an information signal to the wireless transmitter 20 for broadcast to the entire system 10, 11. An identification code is added to the information signal by the sensing device controller 12 so that the system controller 14 and selected device controllers 18 can effectively and selectively process the information signal.

Figure 4:
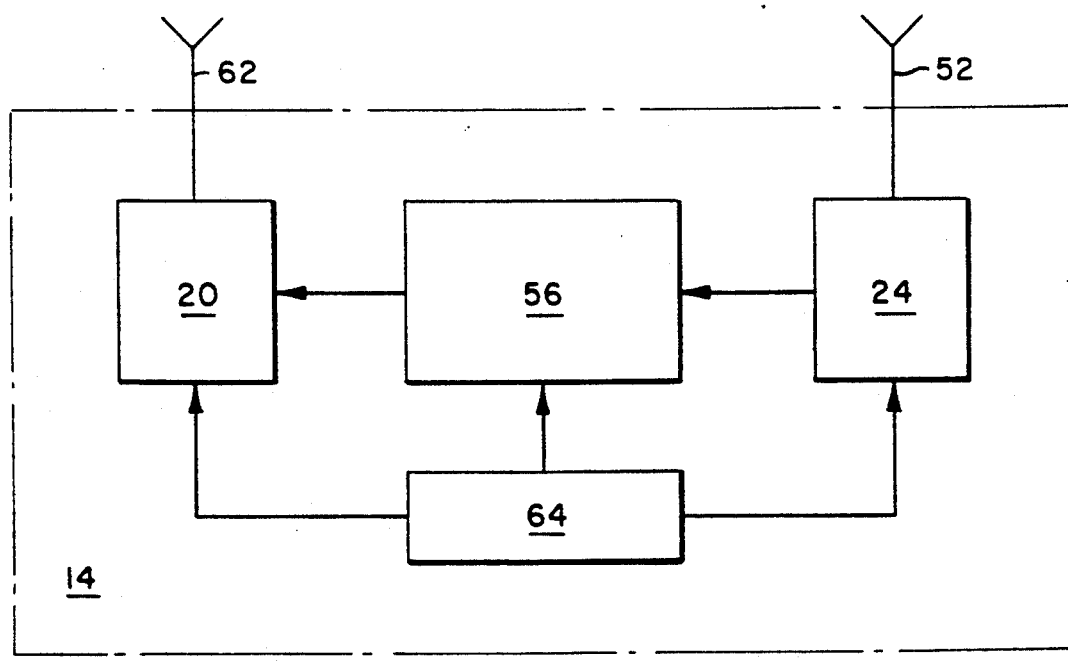
FIG. 4 shows an air conditioning device controller for use with the present invention.

As shown in FIG. 4, the system controller 14 monitors the operation of as many sensing devices 12 as are in the system 10, 11 and coordinates the air conditioning activities of as many air conditioning devices 16 as are present in the system 10, 11. The system controller 14 includes a wireless receiver 24 with a receiving device 52. Signals received by the receiver 24 are forwarded for processing to a microprocessor controller 56 typically including both RAM and ROM memory. Based upon the information content of the received signals, the controller 56 generates commands to coordinate the activities in the system 10, 11. These commands and status information are transmitted by a wireless transmitter 20 having a transmitting attachment 62 to the sensing devices 12 and the device controllers 18. Each element of the system controller 14 is supplied with power by a power supply 64 which, as above with reference to the sensing device(s) 12, may be internal, external, or self-generating.

Preferably the system 10, 11 includes a single system controller 14. However, it may be desirable to provide a redundant system controller 14a which only becomes active upon the failure of the primary system controller 14. Additionally, in large systems 10, 11 it may be necessary to logically or physically divide the system 10, 11. This can be accomplished through the use of local coordinating controllers 17 functioning as intermediate subsets of the system controller 14. For example, a local coordinating controller 17 is often used to coordinate the operation of two or more centrifugal chillers 16h in cooling a building.

The air conditioning device 16 shown in FIG. 1 includes both means for conditioning air 66 and means for supplying conditioned air 70 to a space 72 to be controlled. The device 16 may be any conventional air conditioning system such as illustrated in FIGS. 1 and 2, including a screw compressor system such as is shown in U.S. Pat. Nos. 4,957,517 to Linnert and 4,832,068 to Wendschlag et al., an absorption system such as shown in U.S. Pat. No. 4,028,078 to Peckham, a residential air conditioning system such as shown in U.S. Pat. No. 4,856,286 to Sulfstede et al., a scroll compressor system such as shown in U.S. Pat. No. 4,927,339 to Riffe et al., a rooftop air conditioning system such as shown in U.S. Pat. No. 4,679,411 to Pearse, Jr., or a centrifugal refrigeration system such as shown in U.S. Pat. Nos. 4,220,011 to Bergman et al. and 4,223,537 to Sanborn et al. Each of these aforementioned patents is assigned to the assignee of the resent invention and is hereby incorporated by reference.

Figure 5:
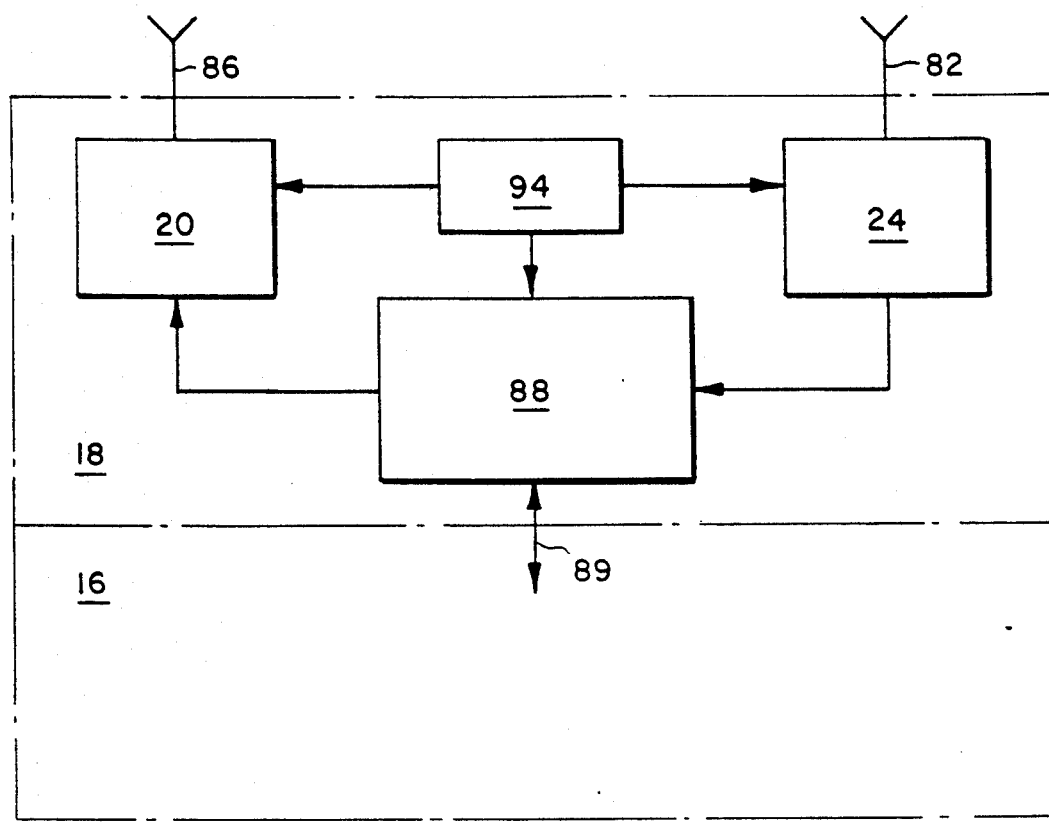
FIG. 5 shows a block diagram of a device controller and an air conditioning device in accordance with the present invention.

As illustrated in FIG. 5, the air conditioning device 16 is controlled by a device controller 18 which includes a wireless receiver 24 having a receiving attachment 82 and a wireless transmitter 20 having a transmitting attachment 86. A microprocessor controller 88 within the device controller 18 is interconnected with the receiver 80 and interconnected with the transmitter 84. The microprocessor controller 88 includes a conventional electrical connection 89 allowing the device controller 18 to control the air conditioning device 16 in accordance with the device controller's programming. Each element of the device controller 18 is supplied with power by a power supply 94 which, as noted above with reference to the sensing device(s) 12, may be internal, external or self generating.

The means for supplying air 70 to the space 72 is preferably a variable air volume system such as illustrated in FIG. 1 or the like but may also be implemented as a chilled water transport or other like system. Variable air volume systems are shown in U.S. Pat. Nos. 4,928,750 to Nurczyk, 4,917,174 to Ring, 4,838,483 to Nurczyk et al., and 4,830,274 to Johnson et al. Each of these patents are assigned to the assignee of the present invention and are herein incorporated by reference.

Preferably the system controller 14 communicates with the sensing device 12 and the device controller 18 by spread spectrum radio frequency transmissions. In spread spectrum radio frequency transmissions, the bandwidth of the transmitted signal is deliberately widened to improve the signal to noise ratio. The use of spread spectrum radio frequency transmissions, as opposed to other types of transmissions media including conventional radio frequency transmissions, is preferred because spread spectrum radio frequency transmissions have greater range, and are far less susceptible to interference from building structures and electronic devices. In spread spectrum communications, a spreading algorithm is selected to spread the transmission over a much greater bandwidth than a conventional transmission bandwidth. Consequently, if the algorithm spreads the bandwidth of the transmission 100 times as wide as the conventional bandwidth, a source of interference which interferes with 50% of a conventional bandwidth's transmission will only interfere with 0.5% of the same transmission sent with the spreading algorithm. Additionally, multiple spreading algorithms can be selected so that simultaneous transmission using different spreading algorithms will, at most, minimally interfere with each other. The use of two distinct redundant transmissions on two distinct frequencies is also preferred to insure that a message is received at its destination even if one frequency is blocked. Spread spectrum radio frequency transmissions are described in a textbook by Robert C. Dixon entitled "Spread Spectrum Systems", 2nd Edition published by John Wiley and Sons, copyright 1984 with a Library of Congress Number TK5102.5.D55 and ISBN 0-471-88309-3. This text is herein incorporated by reference. It should be recognized different spreading algorithms and/or different frequencies may be used to communicate between the various elements of the system 10, 11. However, it is preferable that the elements use the same spreading algorithm and frequency for simplicity of design.

Figure 6:
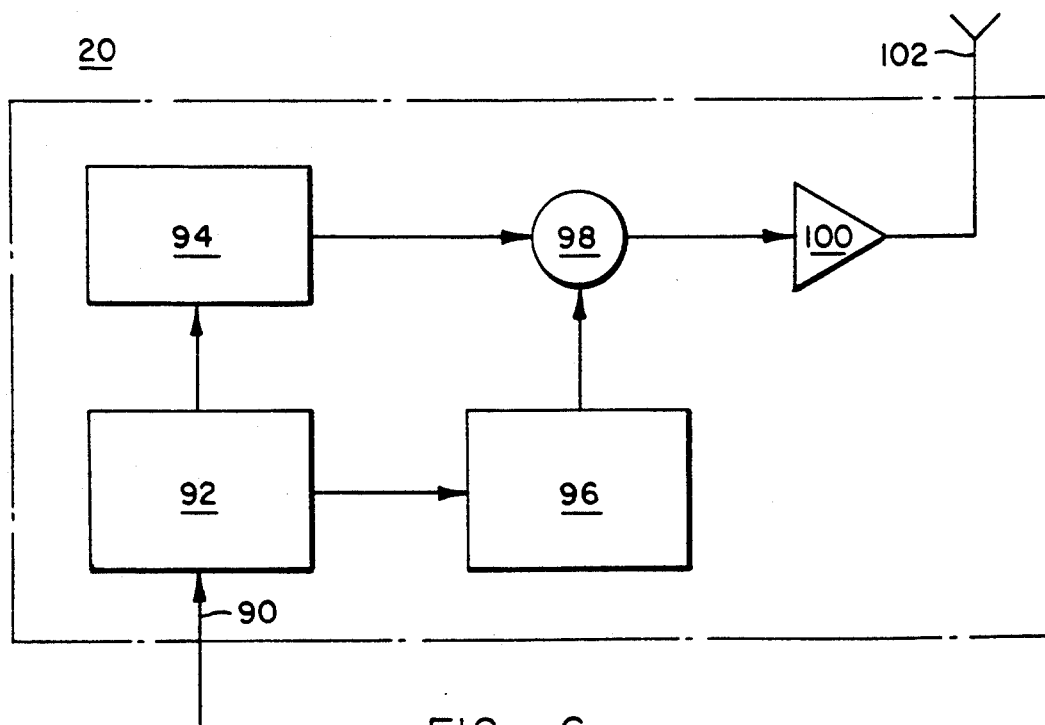
FIG. 6 shows a block diagram of the transmitter of the present invention.

FIG. 6 illustrates the transmitter 20 which receives an information signal on electrical line 90 from a source such as the microprocessor controller 88, the microprocessor controller 56, the sensor device controller 32, the sensor 28, or other signal generator. A transmission controller 92 receives the information signal and generates information and frequency coordinating signals to synchronize and control the operation of a frequency synthesizer 94 and a sequence generator 96. The information and frequency coordinating signals are forwarded to the frequency synthesizer 94 and the sequence generator 96. The frequency synthesizer 94 generates highly accurate signals in discrete frequency steps which are subsequently used as carrier signals. Preferably the frequency synthesizer 94 generates a pair of signals centered around 915 MHZ to provide a pair of redundant carrier signals. It should be noted a single carrier wave signal or three or more signals could just as well be generated depending on the system design and the system environment.

Using the information signal and the spreading algorithm, the sequence generator 96 generates a pseudonumeric sequence to thereby greatly broaden the bandwidth of the information signal to be transmitted. This broadening can be over a contiguous or a discrete spectrum. The resultant broadened signal generated by the sequence generator 96 is combined with the carrier signals synthesized by the frequency synthesizer 94 in a BPSK modulator 98. Other modulators may be used as long as the carrier signal and the broadened signal are combined into at least one transmission signal. Preferably, redundant transmission signals are formed using the pair of carrier signals preferably generated by the frequency synthesizer 94. The transmission signals are then forwarded to a transmitting antenna 102 by means of a power amplifier 100 and transmitted elsewhere in the system 10, 11.

Figure 7:
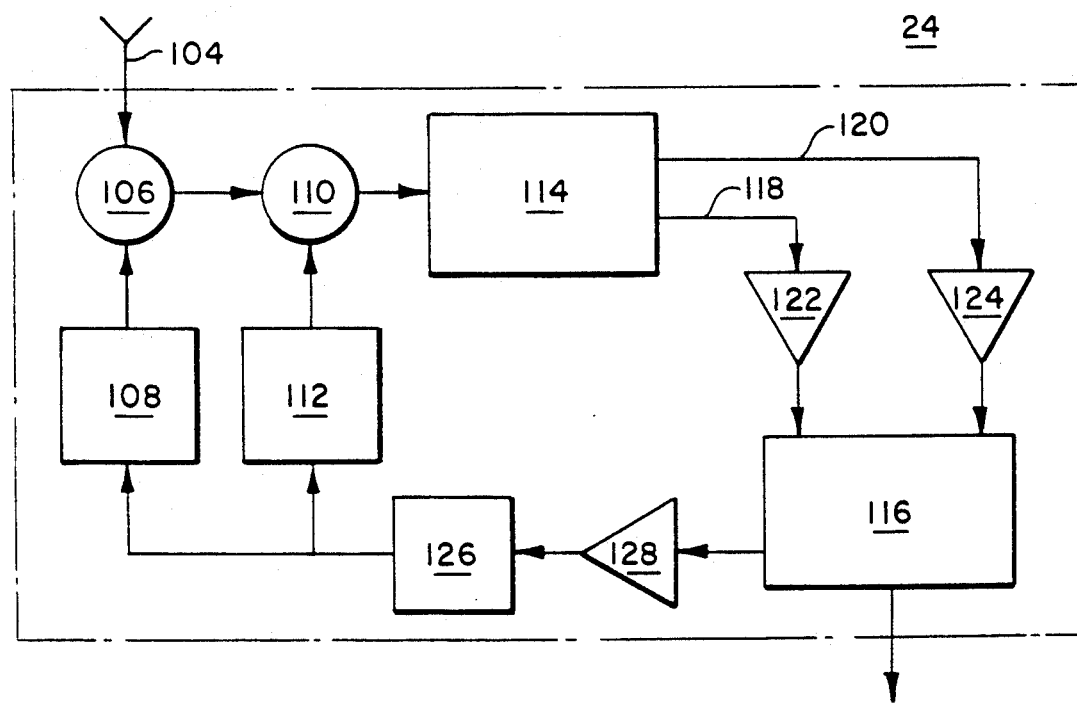
FIG. 7 shows a block diagram of the receiver of the present invention.

FIG. 7 illustrates the wireless receiver 24 which receives at an antenna 104 the transmission signals transmitted by a transmitter 20. In a demodulator 106 the carrier signals corresponding to the synthesized frequency signals are eliminated by counterpart signals generated by a local oscillator 108. Next, a second demodulator 110 eliminates the spreading algorithm represented by the pseudonumeric sequence using a signal generated by a corresponding counterpart pseudonumeric signal generator 112. The remaining signals are forwarded to a narrow band FM receiver 114 which subsequently forwards as many information signals as are received to a microprocessor 116 by means of electrical lines 118, 120. In the preferred embodiment there is an electrical line 118, 120 for as many signals as were originally synthesized in the frequency synthesizer 94 of the transmitter 20. Alternatively a single shared line may be used.

The narrow band FM signals are compared with each other by the microprocessor 116 for accuracy. The electrical lines 118, 120 may be provided with filters 122, 124 respectively. To synchronize the operations of the local oscillator 108 and the signal generator 112, the microprocessor 116 generates an analog signal which is passed through a digital to analog converter 118 to a single frequency source generator 126 such as a crystal oscillator. The single frequency source generator 126 generates a signal which is forwarded to the signal generator 112 and the local oscillator 108, to thereby synchronize the operation of the local oscillator 108 and the sequence generator 112.

Each transmission signal includes an identification code in its information content. Each receiver 24 receives all available transmission signals, and then processes only those signals having predetermined or preselected identification codes. Should a system 10, 11 have problems with message overload or interference, the system 10, 11 may be logically or physically subdivided through the use of multiple, non-interfering spreading algorithms or the addition of local coordinating controllers.

What has been described are two-way wireless HVAC and building automation control system using spread spectrum radio frequency transmissions to link the elements of the system. It will be apparent that there are many modifications and alterations possible in the design of the various elements and in the sensing and air conditioning devices. One such modification includes the substitution of a transceiver for any wireless pair of receiver and transmitter previously described. Other modifications include the substitution of various conventional air conditioning devices and sensors for the air conditioning devices and sensing devices described herein. All such modifications and alternatives are intended to be within the spirit and scope of the invention as claimed by the attached claims.

What is claimed by Letters Patent of the United States is:

1. A building automation system comprising:
   means for conditioning air;
   means, associated with the air conditioning means, for distributing the conditioned air to at least one space to be conditioned;
   means for sensing environmental conditions in the at least one space to be conditioned;
   means for managing the operation of the conditioning means, the distributing means, and the sensing means;
   means, using wireless two-way transmissions, for operably linking the managing means, the conditioning means, the distributing means, and the sensing means;
   wherein the linking means includes a plurality of wireless radio frequency transmitters and receivers using spread spectrum radio frequency transmissions;
   wherein the spread spectrum radio frequency transmissions are transmitted using first and second pseudonumeric spreading algorithms; and
   wherein the building automation system is logically divided by the spread spectrum radio frequency transmissions using the first and second spreading algorithms.

2. The building automation system of claim 1 wherein the linking means includes a wireless radio transmitter and a wireless radio receiver, and where each of the conditioning means, distributing means, sensing means, and managing means, includes at least one of the wireless transmitters and one of the wireless receivers.

3. The building automation system of claim 1 wherein the system is physically divided by spread spectrum radio frequency transmissions using the first and second spreading algorithms.

4. The building automation system of claim 1 wherein the linking means includes a wireless radio transmitter and a wireless radio receiver, and where each of the conditioning means, distributing means, sensing means, and managing means, includes at least one of the wireless transmitters and one of the wireless receivers.

5. A two-way wireless HVAC system comprising:
   a system controller including first means for wireless transmission and first means for wireless reception, the system controller also including means, operably associated with the first transmission means and the first reception means, for monitoring and coordinating the activities of an HVAC system and for transmitting wireless commands;
   means for conditioning air;
   means, associated with the air conditioning means, for supplying conditioned air from the air conditioning means to at least one space to be conditioned;
   means for controlling the air conditioning means, the controlling means including and operably connected to second means for wireless transmission and second means for wireless reception;
   means within the at least one space for sensing an environmental condition, the sensing means including and operably connected to third means for wireless transmission and third means for wireless reception;
   wherein the HVAC system includes at least one of said sensing means transmitting environmental conditions to the system controller and at least one of said air conditioning means receiving wireless commands from the system controller;
   wherein the first, second and third wireless transmission means and the first, second and third wireless reception means operate using a spread spectrum radio frequency transmission; and
   wherein the spread spectrum radio frequency transmissions use either a first pseudonumeric spreading algorithm or a second pseudonumeric spreading algorithm so as to logically divide the HVAC system.

6. A method of operating a building automation system comprising the steps of:
   conditioning air;
   distributing the conditioned air to at least one space;
   sensing environmental conditions in the at least one space;
   controlling the conditioning of air, the distributing of air, and the sensing of environmental conditions;
   coordinating the conditioning of air, the distributing of air, and the sensing of environmental conditions;
   linking the physical components of the building automation system with two-way, wireless spread spectrum radio frequency transmissions; and
   wherein the linking step includes the further steps of making wireless spread spectrum transmissions based on more than one pseudonumeric spreading algorithms, logically dividing the building automation system such that each logical division uses a distinct one of the more than one pseudonumeric spreading algorithms, and receiving the appropriate wireless spread spectrum transmissions in each logical division of the building automation system.

* * * * *